(12) United States Patent
Tindall et al.

(10) Patent No.: US 9,319,278 B2
(45) Date of Patent: Apr. 19, 2016

(54) MESSAGING SYSTEM CONFIGURATOR

(75) Inventors: Steven J. Tindall, Kirkland, WA (US);
Timothy G. Blaisdell, Woodinville, WA (US)

(73) Assignee: Applied Voice & Speech Technologies, Inc., Foothill Ranch, CA (US)

( * ) Notice: Subject to any disclaimer, the term of this patent is extended or adjusted under 35 U.S.C. 154(b) by 550 days.

(21) Appl. No.: 13/007,479

(22) Filed: Jan. 14, 2011

(65) Prior Publication Data

US 2011/0206192 A1 Aug. 25, 2011

Related U.S. Application Data

(63) Continuation of application No. 11/126,624, filed on May 11, 2005, now Pat. No. 7,895,308.

(51) Int. Cl.
*G06F 15/173* (2006.01)
*H04L 12/24* (2006.01)
*H04L 12/58* (2006.01)

(52) U.S. Cl.
CPC ............... *H04L 41/12* (2013.01); *H04L 12/58* (2013.01); *H04L 41/0843* (2013.01); *H04L 41/0853* (2013.01); *H04L 41/082* (2013.01)

(58) Field of Classification Search
USPC ................................. 709/223–226
See application file for complete search history.

(56) References Cited

U.S. PATENT DOCUMENTS

| | | | |
|---|---|---|---|
| 5,287,498 A * | 2/1994 | Perelman et al. | |
| 5,493,607 A * | 2/1996 | Arumainayagam et al. | 379/88.18 |
| 5,621,727 A * | 4/1997 | Vaudreuil | 370/401 |
| 5,659,599 A * | 8/1997 | Arumainayagam et al. | 379/67.1 |
| 5,661,781 A * | 8/1997 | DeJager | 379/144.07 |
| 5,819,042 A * | 10/1998 | Hansen | 709/222 |
| 5,922,071 A * | 7/1999 | Taylor et al. | 713/1 |
| 5,974,468 A * | 10/1999 | Taylor et al. | 719/328 |
| 5,987,528 A * | 11/1999 | Taylor et al. | 719/328 |
| 6,034,687 A * | 3/2000 | Taylor et al. | 715/775 |
| 6,038,586 A * | 3/2000 | Frye | 718/100 |
| 6,233,318 B1 * | 5/2001 | Picard et al. | 379/88.17 |
| 6,307,931 B1 * | 10/2001 | Vaudreuil | 379/229 |
| 7,003,562 B2 * | 2/2006 | Mayer | 709/223 |
| 7,010,780 B2 * | 3/2006 | Perycz et al. | 717/107 |
| 7,092,509 B1 * | 8/2006 | Mears et al. | 379/266.01 |
| 7,231,403 B1 * | 6/2007 | Howitt et al. | |
| 7,317,699 B2 * | 1/2008 | Godfrey et al. | 370/328 |
| 2002/0120724 A1 * | 8/2002 | Kaiser et al. | 709/221 |

(Continued)

*Primary Examiner* — Hua Fan
(74) *Attorney, Agent, or Firm* — Anatoly S. Weiser, Esq.; Techlaw LLP

(57) ABSTRACT

Apparatus, methods, and machine-readable articles of manufacture facilitate configuration of a networked messaging system. In some embodiments, nodes of the system are automatically interrogated to obtain current configuration information of each of the nodes, and a configuration file with the nodes' current configuration information is generated and stored in a format that is readily editable. Exemplary formats include spreadsheet, comma separated variables, and other text formats. An administrator is allowed to access and edit the configuration file, resulting in an updated configuration file with updated configuration information. Editing may include adding and removing servers, creating and removing digital networking mailboxes or links on the nodes, and other configuration changes. After the file is edited and the administrator or another authorized person issues a command to configure the system, messages are automatically sent to the nodes to configure the system in accordance with the updated configuration information.

19 Claims, 15 Drawing Sheets

(56) References Cited

U.S. PATENT DOCUMENTS

| | | | |
|---|---|---|---|
| 2002/0132609 A1* | 9/2002 | Lewis et al. | 455/412 |
| 2002/0147817 A1* | 10/2002 | Rao | 709/228 |
| 2003/0051010 A1* | 3/2003 | French et al. | 709/220 |
| 2003/0055919 A1* | 3/2003 | Fong et al. | 709/220 |
| 2003/0088633 A1* | 5/2003 | Chiu et al. | 709/206 |
| 2003/0126259 A1* | 7/2003 | Yoshida et al. | 709/225 |
| 2003/0131107 A1* | 7/2003 | Godse et al. | 709/225 |
| 2004/0073659 A1* | 4/2004 | Rajsic et al. | 709/224 |
| 2004/0146147 A1* | 7/2004 | Picard et al. | 379/88.22 |
| 2004/0255269 A1* | 12/2004 | Santori et al. | 717/109 |
| 2006/0037016 A1* | 2/2006 | Saha et al. | 717/178 |
| 2006/0046698 A1* | 3/2006 | O'Brien | 455/413 |
| 2008/0037736 A1* | 2/2008 | Rapaport et al. | 379/88.23 |

* cited by examiner

FIG. 4C

MESSAGING SYSTEM CONFIGURATOR

CROSS-REFERENCE TO RELATED APPLICATION

This application is a continuation of and claims priority to U.S. patent application Ser. No. 11/126,624, entitled MESSAGING SYSTEM CONFIGURATOR, filed on May 11, 2005 now U.S. Pat. No. 7,895,308. The disclosure of the foregoing patent document is incorporated herein by reference as if fully set forth herein, including Figures, Claims, Tables, and Computer Program Listing Appendix.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING APPENDIX

Two compact discs (CDs) were filed with U.S. patent application Ser. No. 11/126,624, of which this application is a continuation. The CDs are identical. Their content is hereby incorporated by reference as if fully set forth herein. Each CD contains files listing header information or code used in a processor of a server node in accordance with an embodiment of the present invention. The following is a listing of the files included on each CD, including their names, sizes, and dates of creation:

BACKGROUND OF THE INVENTION

1. Field of the Invention

The present invention relates generally to telecommunication systems and methods, and, more particularly, to apparatus and methods for configuring and managing multi-node messaging networks.

2. Background

Voice messaging systems with multiple networked nodes have become quite common. A typical networked digital messaging system has a number of interconnected server nodes. Each of the nodes may be thought of as a computer-based system that performs communications functions, such as telephony/voicemail, email, facsimile, and possibly other messaging functions, at a particular location. Usually, the nodes are geographically remote to each other, but this is not a requirement of such systems. For example, different nodes of a system may be located in adjacent buildings, on different floors of the same building, in the same room, or even within a single equipment rack.

The nodes are interconnected using a network that allows the nodes to send messages to each other, such as the Internet or another digital communication network. Sending messages, however, may require the nodes to have prior knowledge of each other. The nodes therefore need to be configured within the network to enable exchange of messages between or among the nodes.

Each node has a number of digital networking mailboxes used for sending messages. When a message is sent within the network, it is addressed to one or more specific mailboxes. An addressee mailbox may correspond to a voicemail mailbox, a facsimile mailbox, an email mailbox, or another kind of user- or subscriber-related mailbox, i.e., a mailbox associated with

```
Volume in drive D is 050507_2206
Volume Serial Number is 2036-2803
Directory of D:\
05/07/2005      11:06 PM        <DIR>       CD-ComputerCode
            0 File(s)              0 bytes
Directory of D:\CD-ComputerCode
05/07/2005      11:06 PM        <DIR>       .
05/07/2005      11:06 PM        <DIR>       ..
05/07/2005      11:05 PM        <DIR>       DNConfigurator
05/07/2005      11:05 PM        <DIR>       Msgif
            0 File(s)              0 bytes
Directory of D:\CD-ComputerCode\DNConfigurator
05/07/2005      11:05 PM        <DIR>       .
05/07/2005      11:05 PM        <DIR>       ..
12/17/2004      10:35 AM                    1,044 AssemblyInfo.vb
02/18/2005      03:05 PM                    8,728 DebugForm.resx
02/18/2005      03:05 PM                    4,260 DebugForm.vb
04/20/2005      02:45 PM                   24,336 DNConfigurator.resx
12/17/2004      11:47 AM                      913 DNConfigurator.sln
04/20/2005      02:45 PM                  116,559 DNConfigurator.vb
04/20/2005      02:35 PM                    6,551 DNConfigurator.vbproj
03/18/2005      04:44 PM                    1,919 DNConfigurator.vbproj.user
03/18/2005      04:40 PM                   13,339 NewServer.resx
03/18/2005      04:40 PM                    9,508 NewServer.vb
03/18/2005      04:42 PM                    8,732 ServerList.resx
03/18/2005      04:42 PM                    4,941 ServerList.vb
04/20/2005      02:22 PM                  303,025 Splash.resx
04/20/2005      02:22 PM                    2,390 Splash.vb
           14 File(s)         506,245 bytes
Directory of D:\CD-ComputerCode\Msgif
05/07/2005      11:05 PM        <DIR>       .
05/07/2005      11:05 PM        <DIR>       ..
04/19/2005      06:05 PM                   11,272 DNAutoConfig.cpp
            1 File(s)          11,272 bytes
    Total Files Listed:
           15 File(s)         517,517 bytes
            9 Dir(s)               0 bytes free
``` one or more individual system users, from which the user or users may retrieve the message. The addressee mailbox may also correspond to a system mailbox, for example, a mailbox associated with a particular node, or a logical location for storing system-related data, such as system configuration data.

Consider, for example, a three-node system with nodes A, B, and C connected via a network. Node A may have a mailbox for node B, a mailbox for node C, and mailboxes for the individual users/subscribers at the location of node A. Similarly, node B may have a mailbox for node A, a mailbox for node C, and mailboxes for the users/subscribers at the location of node B. When a message is sent from a first subscriber on node A to a second subscriber on node B, the message includes two mailbox references: (1) a mailbox number for node B (as the B mailbox exists on node A), and (2) a mailbox number for the second subscriber (as the second subscriber mailbox exists on node B). Node A looks at the first mailbox number and, accordingly, routes the message to node B. When node B receives the message, it looks at the second mailbox number and, accordingly, routes the message to the second subscriber.

Next, consider the problem of adding a new node—D, for example—to this system. First, the various nodes must be interrogated to determine the topology of the system. This is particularly true in a peer-to-peer paradigm, where a central repository for configuration information generally does not exist. Each node thus must be interrogated to find out the node's connections to other nodes; it is possible that one or more nodes are not connected to all other nodes. For example, node B may not be connected to node C.

Second, a person with appropriate authority must logon to each of the existing nodes (A, B, and C) and create a mailbox for the new node D on each of the existing nodes, so that node D and subscribers on node D can be addressed from each of the existing nodes.

Third, a person with appropriate authority must logon to node D and create mailboxes for the existing nodes A, B, and C.

User identifications (IDs) and passwords for logon may not be identical on all the nodes. Furthermore, while mailbox numbers are unique on a particular node, they need not be (and generally are not) unique system-wide. For example, the mailbox number for node A may be 9000 on node B; the mailbox number for node A may be 650 on node C. As can be seen, a different number of digits may be used for mailbox numbering on different nodes. There may be other mailbox numbering rules that differ from node to node.

Moreover, different administrators at the different nodes may need to cooperate in assigning the mailbox numbers. For example, an administrator of node A may have to approve the assignment of the new mailbox number on node A for the new node D. Thus, an administrator on node B may not be able to configure the system without consultation with the administrator on node A (and with administrators of all the other nodes). Indeed, multiple administrators may have to agree to assignment of certain mailbox numbers.

When the number of nodes or the number of mailboxes is large, adding a new node becomes a long and tedious process requiring attention to detail and cooperation among a number of administrators. Because of its complexity, the process is error-prone. After each error, at least part of the process needs to be repeated to correct the error. While the system is misconfigured due to such an error, the system or its portions may be disabled, detrimentally affecting telecommunications across the enterprise.

Other changes to system configuration present similar problems.

It would be desirable to facilitate the process of modifying system configuration, including addition and deletion of nodes, and assignment of mailbox numbers. It would also be desirable to reduce instances of system misconfiguration. It would further be desirable to facilitate cooperation of administrators in the course of configuring a networked system.

SUMMARY

A need thus exists to facilitate the process of configuring networked messaging systems, facilitate cooperation of system administrators in configuring networked messaging systems, and reduce instances of improper configuration (misconfiguration) of networked messaging systems.

Embodiments of the present invention are directed to methods, apparatus, and articles of manufacture that satisfy one or more of these needs. In some embodiments, the invention herein disclosed is a computer implemented method of configuring a networked messaging system. The method includes automatically interrogating nodes of the system to obtain current configuration information of each node of a plurality of the nodes of the system, and generating a configuration file with the current configuration information. An administrator is then allowed to access and edit the configuration file, resulting in an updated configuration file that includes updated configuration information. After the administrator commits the changes to the file and issues a command to configure the system, the messaging system is automatically configured in accordance with the updated configuration information in the updated configuration file.

In selected aspects of the invention, the interrogating and configuring steps may be carried out serially, node-by-node, or substantially in parallel, so that interrogatory requests and configuration commands are issued to the servers without waiting for responses to the previously issued requests/commands.

In selected aspects of the invention, the method includes storing the configuration file after the file is generated but before the administrator is allowed to edit the file. The file may be stored in a spreadsheet format, in a text format, and in a comma separated variables format.

In selected aspects of the invention, the method includes storing the configuration file after the configuration file is edited by the administrator (or another authorized person) and before the command to configure is issued and the system is configured. The file may be stored in a spreadsheet format, in a text format, and in a comma separated variables format.

In selected aspects, interrogation may include interrogation of all or a plurality of the nodes of the system, including the home server node from which the method is performed. Similarly, configuring may include configuring of all or a plurality of the nodes of the system, including the home server node.

In selected aspects, configuring includes sending to each node of the messaging system at least a portion of the updated configuration information that affects configuration of that node.

In selected aspects, configuring includes sending to each node of the messaging system only the portion of the updated configuration information that affects configuration of that node.

In selected aspects, the administrator is allowed to edit the configuration file so that a server is added to and/or removed from the messaging system after the step of configuring.

In selected aspects, the administrator is allowed to edit the configuration file so that a mailbox on a correspondent server (i.e., a server of the messaging system connected to the home server via the network) is added and/or removed after the step of configuring.

In selected aspects, the method includes sending a message from a home server to a correspondent server. The message may include an inquiry whether a new mailbox of a particular type with a particular mailbox identifier is consistent with mailbox numbering rules of the correspondent server, and/or a request to assign a mailbox identifier to a new mailbox of a particular type in accordance with the mailbox numbering rules of the correspondent server.

In selected aspects, the method includes displaying changes that will be made to the messaging system when the step of configuring is performed; the changes are displayed after the step of allowing the administrator to edit the configuration file, but before the messaging system is automatically configured.

In selected aspects, the method includes indicating to the administrator errors that occur during interrogation and/or configuration steps.

In selected aspects, the method includes manually editing the configuration file. The file may be manually edited by multiple persons.

In some embodiments, the invention herein disclosed is a home server node of a messaging system that includes the home server node and one or more correspondent nodes connected to the home server node. The home server node includes a network interface coupling the home server node to the network that connects the nodes, a user interface configured to display information to and receive information from a person, and at least one processor coupled to the network interface and to the user interface. The at least one processor is configured to perform the methods described above and elsewhere in this document. For example, the at least one processor may be configured to:

Interrogate the one or more correspondent nodes of the system to obtain current configuration information of the one or more correspondent nodes;

Generate a configuration file with the current configuration information;

Allow an administrator to access and edit the configuration file through the user interface, resulting in an updated configuration file with updated configuration information;

Receive a command to configure the system; and

In response to the command, send messages to the one or more correspondent nodes configuring the messaging system in accordance with the updated configuration information in the updated configuration file.

In selected aspects, the at least one processor is also configured to store the configuration file after the configuration file is edited and before the messages are sent.

In some embodiments, the invention herein disclosed is a peer-to-peer networked messaging system with a plurality of nodes, including at least one home server node such as described above or elsewhere in this document.

In some embodiments, the invention herein disclosed is at least one machine readable memory device storing instructions. When the instructions are executed by at least one processor of a home server node of a messaging system that includes the home server node and a plurality of correspondent nodes connected to the home server node, the instructions configure the at least one processor to perform the methods described above and elsewhere in this document. For example, the instructions may configure the at least one processor of the home server node (and through the processor, configure the home server node) to perform the following steps:

Interrogate the correspondent nodes of the system to obtain current configuration information of the correspondent nodes;

Generate a configuration file with the current configuration information;

Allow an administrator to access and edit the configuration file through the user interface, resulting in an updated configuration file with updated configuration information;

Receive a command to configure the messaging system; and

In response to the command, send messages to the correspondent nodes configuring the messaging system in accordance with the updated configuration information in the updated configuration file.

These and other features and aspects of the present invention will be better understood with reference to the following description, drawings, and appended claims.

BRIEF DESCRIPTION OF THE FIGURES

FIGS. 4A through 4L illustrate selected display windows of a messaging system configurator, in accordance with an embodiment of the present invention.

DETAILED DESCRIPTION

Figure 1:
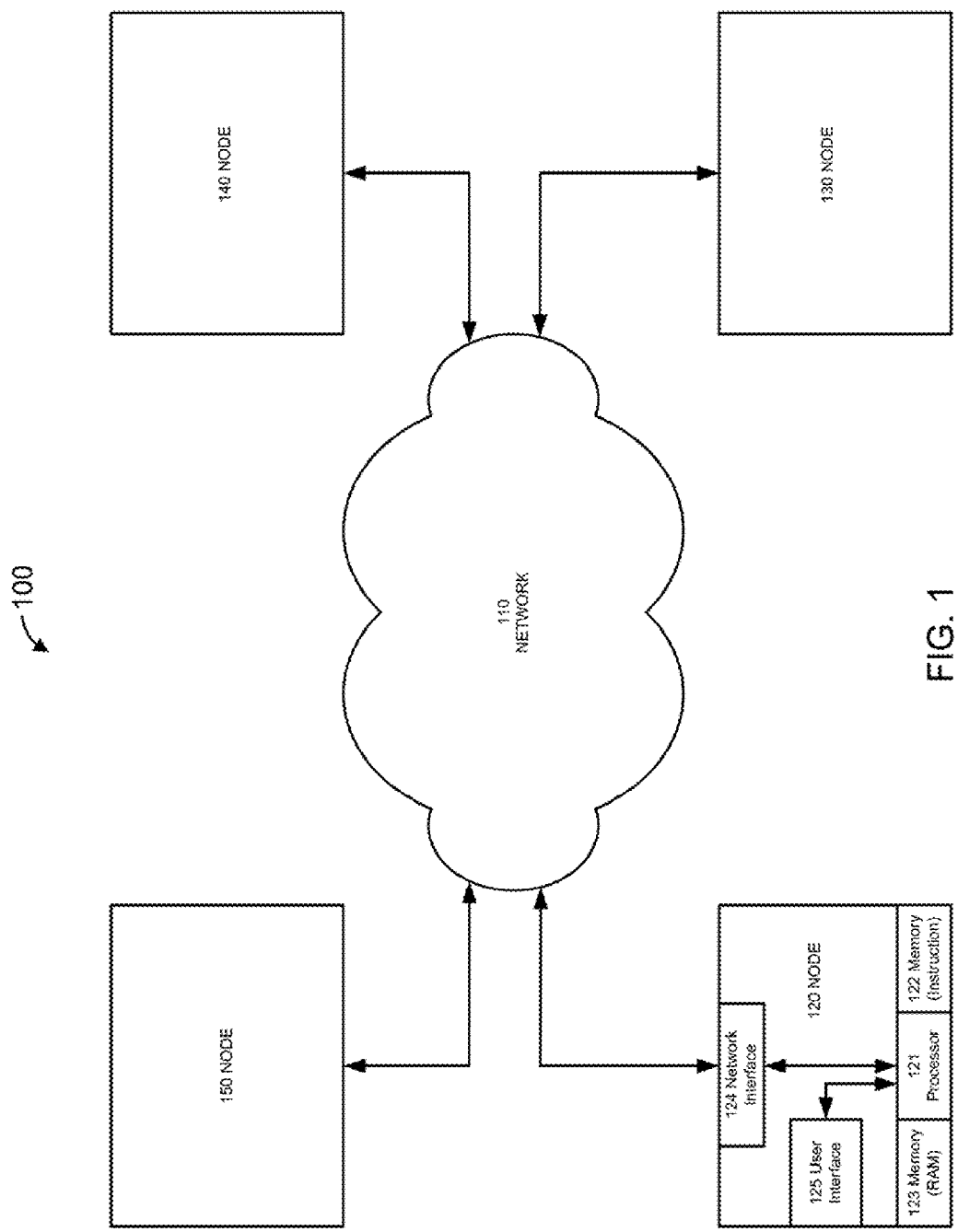
FIG. 1 is a high-level block diagram of a messaging system that includes multiple server nodes interconnected via a communication network, wherein one of the server nodes is arranged in accordance with an embodiment of the present invention.

In this document, the words "embodiment" and "variant" refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar expressions and phrases are used to indicate one of a number of different possible embodiments. The number of possible embodiments is not necessarily limited to two or any other quantity. Characterization of an item as "exemplary" means that the item is used as an example. Such characterization of an embodiment does not necessarily mean that the embodiment is a preferred embodiment; the embodiment may but need not be a currently preferred embodiment. All embodiments are described for illustration purposes and are not strictly limiting.

The words "couple," "connect," and similar expressions with their inflectional morphemes do not necessarily import an immediate or direct connection, but include connections through mediate elements within their meaning.

A "node" of a messaging system is a computer system that performs communications functions at a particular location, as has already been explained and exemplified in the BACKGROUND section of this document. The words "node" and "server," and the expression "server node" are used interchangeably. A "home server node" is the node or one of the nodes of a messaging system from which the process of configuring the messaging system is performed. A "correspondent node" is a node connected to the home server node via a network. It should be noted that the administrator performing system configuration need not be at the home server node; the administrator may be logged on to the home server node from another node, for example, from a correspondent node.

When used in relation to nodes of a networked messaging system, the word "configure" and its inflectional morphemes signify interrelating the various system elements to facilitate sending and receiving messages between or among the nodes. In particular, the concept of "configuring" in this context includes defining and numbering mailboxes within a messaging system.

A "mailbox" or a "digital networking mailbox" is a link or addressable target for sending and forwarding messages within a networked messaging system, such as a voice messaging system.

Other and further definitions and clarifications of definitions may be found throughout this document.

The invention herein disclosed can be implemented in one or more server nodes that include a call management and/or unified communications system, such as the systems described in a patent application entitled APPARATUS AND METHOD FOR PERSONALIZED CALL ACKNOWLEDGEMENT, filed on Sep. 2, 2004, Ser. No. 10/932,745; and in a patent application entitled APPARATUS AND METHOD FOR NOTIFICATION OF A PARTY IN A TELEPHONE CONFERENCE, filed on Nov. 15, 2004, Ser. No. 10/988,809. These commonly-assigned patent applications are incorporated herein by reference in their entirety, including all tables, figures, and claims.

Reference will now be made in detail to several embodiments of the invention that are illustrated in the accompanying drawings. Same reference numerals are used in the drawings and the description to refer to the same apparatus elements and method steps. The drawings are in simplified form, not to scale, and omit apparatus elements and method steps that can be added to the described systems and methods, while including certain optional elements and steps.

FIG. 1 illustrates, in a high-level block diagram manner, a multi-node distributed messaging system 100 that includes server nodes 120, 130, 140, and 150 interconnected via a network 110. In the illustrated embodiment, the network 110 is a wide area digital communication network, such as the Internet. In some embodiments, the network 110 is a local area network, intranet, extranet, virtual private network, or another type of public or private network. Furthermore, the network 110 may also be implemented as a number of dedicated connections between the server nodes 120, 130, 140, and 150. The network 110 may also combine different networks using different communication technologies.

The server node 120 includes at least one processor 121 executing program code stored in an instruction memory module 122 to control operation of the server node 120. The processor 121 may be a microprocessor, for example. A memory module 123 serves as operational or scratchpad memory for use as operating registers, address registers, and for other temporary data storage during program execution. The instruction memory module 122 may be a read-only memory (ROM) device, while the memory module 123 may be a random access memory (RAM) device.

Under control of the program code instructions, the processor 121 configures the server node 120 to perform telephony (voice communications and voicemail) and other communication functions for the users/subscribers of the node 120. The other communication functions include, for example, transmission and receipt of facsimile and email messages. Appropriate interfaces for these communication functions may also be provided, although they are not illustrated in FIG. 1. The program code instructions further configure the server node 120 to perform steps, processes, and functions described below, including system configuration processes. The program code may be loaded into the instruction memory module 122 from a machine-readable medium, such as a CD, DVD, flash memory, floppy or hard drive, another ROM module, or a similar memory or storage device.

A network interface card 124, which is also controlled by the processor 121, allows the server node 120 to send information to and receive information from other server nodes via the network 110, including server nodes 130, 140, and 150. The information includes configuration data and commands. A user interface 125 provides a human administrator with access to the server node 120 and, through the server node 120, to the rest of the system 100, including server nodes 130, 140, and 150. In an embodiment, the user interface includes a display, a keyboard, and an associated pointing device.

Each of the server nodes 130, 140, and 150 may be similar to the server node 120, although this is not necessarily a requirement of the invention.

In the illustrated embodiment, the server nodes 120, 130, 140, and 150 are connected to each other through the network 110, but not in the SMTP sense, requiring configuration of the nodes prior to communicating messages between the nodes, as has already been mentioned in the BACKGROUND section of this document. Configuration information for a particular node is stored on that node and may be modified (and, initially, created) through one of the user interfaces, e.g., the user interface 125, by a person with administrative privileges ("administrator") on the particular node. In the illustrated embodiment, each server node may be configured independently from the other nodes of the messaging system 100. Thus, the messaging system 100 operates in the so-called peer-to-peer paradigm.

An administrator may logon to the particular node using the user interface of that node, e.g., using the user interface 125 to logon to the server node 120. It should also be noted that an administrator may be able to logon to the node from a different node. For example, an administrator with privileges on the server nodes 130, 140, or 150 may be able to logon to each of these nodes from the node 120 via the network 110. Moreover, in some embodiments an administrator properly logged onto a node may be granted full or partial administrative privileges on other nodes. In other words, a server node of the messaging system 100 may grant administrative privileges to an administrator of another node properly logged onto the other node.

Server node configuration includes configuration and numbering of various digital networking mailboxes, i.e., links or addressable targets for sending and forwarding messages, such as system messages and user voicemail, email, and facsimiles. Mailbox and other configuration data may be stored in the memories or storage devices (e.g., disk drives) of the server nodes. For example, the server node 120 may store its mailbox configuration data in a non-volatile rewritable device, for example, in electrically erasable programmable ROM (EEPROM) or a low-power battery-backed RAM. In some embodiments, the configuration data are stored on magnetic disks.

Mailbox numbering rules may be stored on the server nodes 120, 130, 140, and 150 similarly to the configuration data. Note that mailbox numbering need not be consistent across the server nodes of the messaging system 100. For example, a mailbox reference to the server node 130 used by the server node 120 may differ from a mailbox reference to the server node 130 used by the server node 140. Numbering rules may also differ from node to node.

Figure 2:
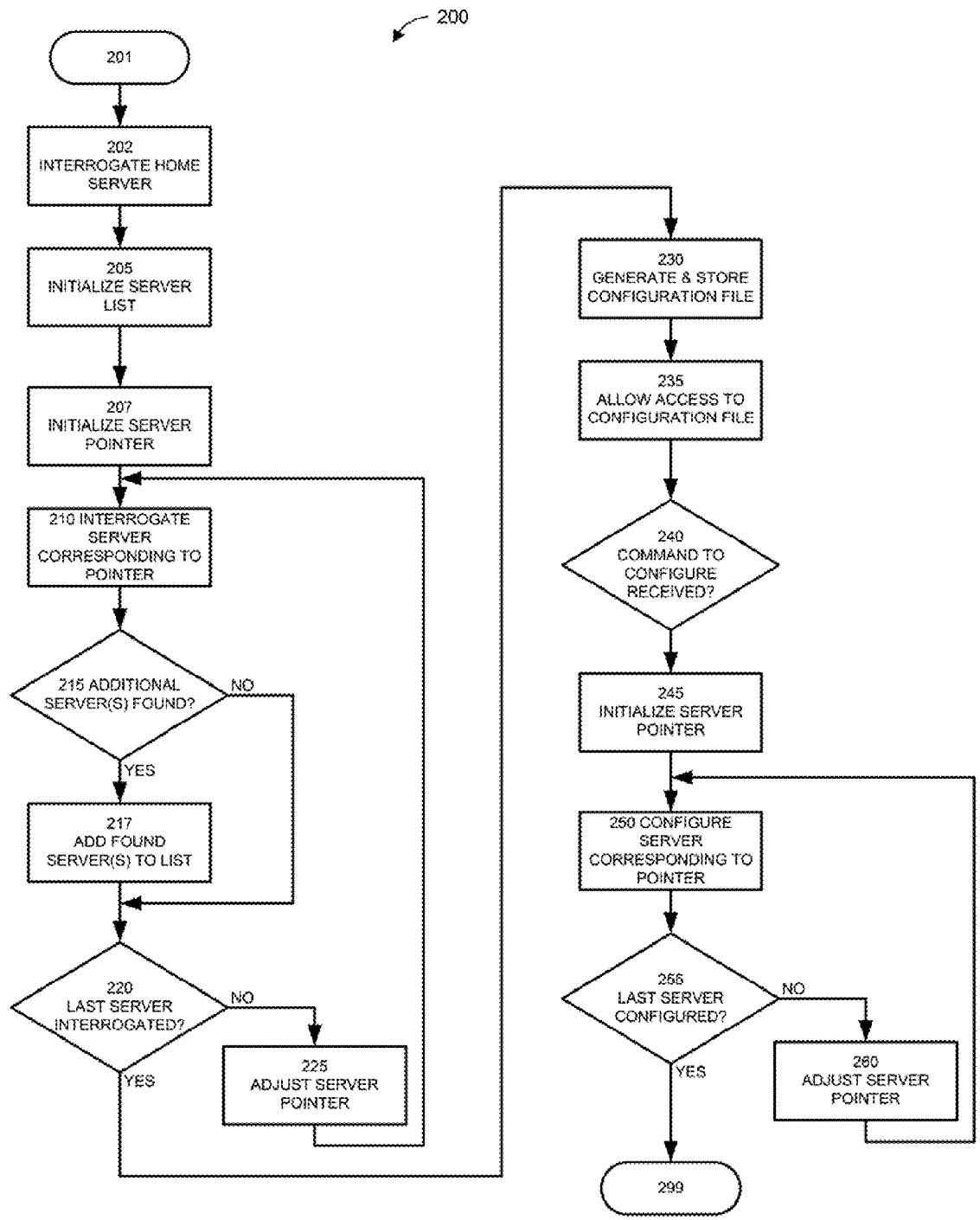
FIG. 2 is a process flow diagram illustrating selected steps and decision blocks of a process for modifying configuration data of server nodes of a messaging system, in accordance with an embodiment of the present invention.

FIG. 2 is a process flow diagram illustrating selected steps and decision blocks of a process 200 for modifying configuration data of the nodes of the messaging system 100. The process 200 may be performed, in whole or in part, by the server node 120 of FIG. 1, for example. Although the process steps and decisions are described serially, certain steps and decisions may be performed by separate elements in conjunction or in parallel, asynchronously or synchronously, in a pipelined manner, or otherwise. There is no particular requirement that the steps and decisions be performed in the same order in which this description lists them, except where a specific order is inherently required, explicitly indicated, or is otherwise made clear from the context. Furthermore, not every illustrated step and decision block may be required in every embodiment in accordance with the invention, while some steps and decision blocks that have not been specifically illustrated, may be desirable or necessary in some embodiments in accordance with the invention.

At flow point 201, the server node 120 is properly configured and ready to perform the steps of the process 200. (In this description, the server node 120 is a "home" server, i.e., the server from which system configuration is performed; other server nodes of the messaging system 100 are "correspondent" nodes, i.e., nodes with which the server node 120 communicates via the network 110.) In step 202, the home server is interrogated to determine the network configuration stored on that server. Here, in effect, the home server interrogates itself.

In step 205, a server list is initialized. The initialized server list contains a record of servers of the system 100 as determined from the interrogation of the home server in the step 202.

In step 207, a server pointer is initialized. As will be seen shortly, the server pointer is used to step through the server nodes on the server list. The server pointer may be a simple counter, with each server on the list corresponding to a number (e.g., 0, 1, . . . n). When the server pointer is initialized in the step 207, it is pointing to the first server (other than the home server) on the list. The home server is skipped because it has already been interrogated in the step 202.

In step 210, a server node corresponding to the current value of the server pointer is interrogated to discover the node's configuration.

In decision block 215, a determination is made whether interrogation of the node corresponding to the current value of the server pointer has resulted in new server or servers being found. If new servers were found, they are added to the server list, in step 217. Otherwise, the step 217 is passed over.

In decision block 220, a determination is made whether all servers that need to be interrogated have been interrogated. If some servers have not been interrogated, process flow branches to step 225, in which the server pointer is adjusted to point to another server on the server list; for example, the server counter is incremented.

If the determination in the decision block 220 indicates that all servers on the list that need to be interrogated have been interrogated and their configuration information discovered, process flow proceeds to step 230 to generate and store a network configuration file. The network configuration file includes configuration information of the interrogated server nodes. In some embodiments, the file is generated in a text or spreadsheet format. For example, the file may be in a comma separated variables (CSV) format, readable by the Excel® spreadsheet application of Microsoft corporation. Comma separated variables and other common formats advantageously allow editing of the configuration file with standardized software in widespread use. It should be understood, however, that some embodiments use other formats, both compatible and incompatible with various spreadsheet applications. Indeed, the format of the configuration file may be a proprietary format readable and editable through a custom software application.

In step 235, the configuration file is offered for editing. For example, the file may be sent (emailed) to an appropriate person, such as a person with administrative privileges on the messaging system, or the file is simply made accessible to such a person or persons. The person or persons may edit the file one or more times, and then store the file, committing the changes/edits.

In decision block 240, the system determines whether the edited configuration file has been committed and a command to proceed with system configuration in accordance with the file is received from an authorized person or persons. The authorized person may be, for example, any one of the persons with administrative privileges who is allowed to edit the configuration file. It should be noted, however, that not all of the persons authorized to edit the file may be authorized to issue a command to the server node to configure the messaging system. In some embodiments, the command to configure the system may be issued by two or more persons acting in concert. The additional precautions in accepting the command help prevent accidental and subversive enterprise-wide misconfiguration of the messaging system.

Once the appropriately authorized command to configure the messaging system is received, process flow advances to step 245, in which the server pointer is initialized. For example, the server pointer is initialized to point to the first server on the list. Note that in the step 245, there is no need to skip the home server, as was done in the step 207.

In step 250, the server node corresponding to the current value of the server pointer is configured. For example, the server node 120 (on which the process 200 is executed) automatically logs onto the server node corresponding to the current value of the pointer using administrator identification and password, and configures that server node in accordance with the data in the configuration file. The server node corresponding to the current pointer value may be rebooted after the configuration file parameters are downloaded and stored locally on that server node, causing the new configuration to become effective. In some embodiments, the server nodes are rebooted after all the nodes have been configured. For example, the server node 120 may issue a reboot command to the server nodes of the messaging system 100 at the end of the process 200. (This step is not shown in FIG. 2.) In some embodiments, the new configuration parameters take effect without rebooting. In some embodiments, local server administrators decide when the new configuration becomes effective.

The step 250 may be omitted for those server nodes that are not being reconfigured. For example, the step 250 may be omitted for a server node whose new configuration parameters are identical to the old configuration parameters.

In some embodiments, configuring a node is performed by sending configuration command(s) with updated configuration data to the node. All or a portion of the configuration file may be sent to the node. For example, only the portion of the configuration file affecting the node may be sent to the node.

From the step 250 process flow advances to decision block 255, to determine whether all the server nodes have been processed (configured) in the step 250. If additional server nodes need to be processed, process flow branches to step 260, adjusting (e.g., incrementing) the server pointer value so that the server pointer now points to the next server to be processed.

After all server nodes have been configured, process flow terminates at flow point 299.

Figure 3:
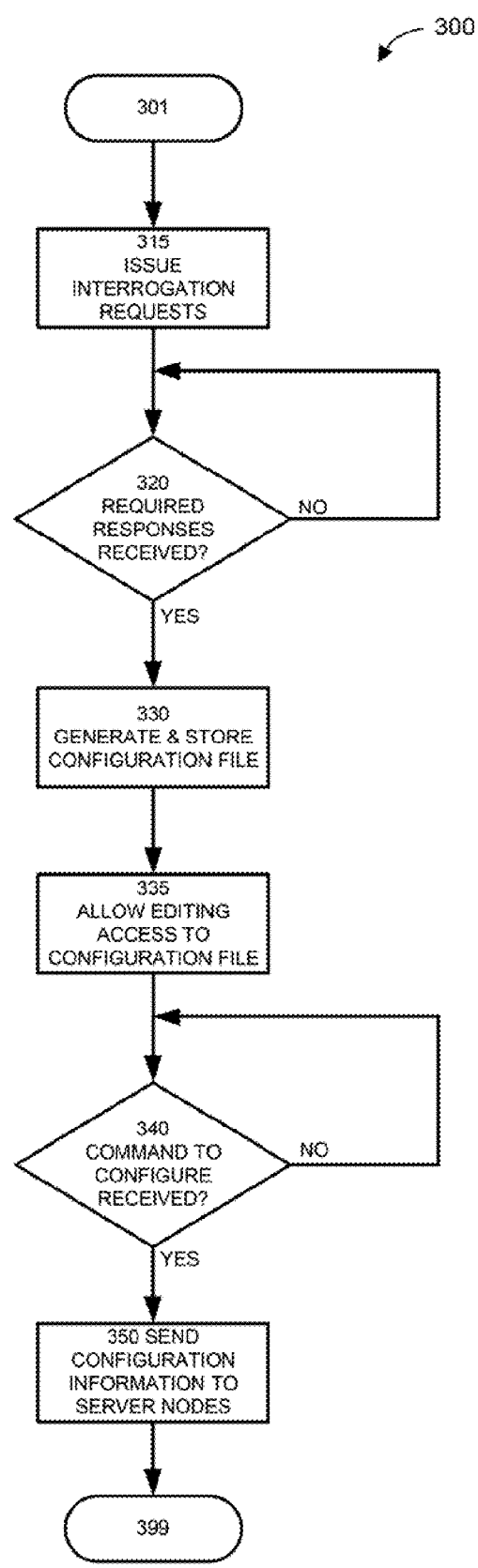
FIG. 3 is a process flow diagram illustrating selected steps and decision blocks of another process for modifying configuration data of server nodes of a messaging system, in accordance with an embodiment of the present invention.

Interrogating and configuring individual server nodes need not be done in any particular order. Moreover, interrogation and configuration need not be carried out serially, node by node; these functions may also be carried out in parallel. FIG. 3, which shows selected steps and decision blocks of a process 300 for modifying configuration data of the server nodes of the messaging system, illustrates these notions.

At flow point 301, the server node 120 is properly configured and ready to perform the steps of the process 301. In step 315, the server node issues interrogation requests to the server nodes of the messaging system 100. Here, the interrogation requests are issued substantially in parallel, without waiting for responses. At decision block 320, the server node 120 determines whether responses from all the nodes that need to be configured have been received. If the additional responses are needed, process flow loops back to the input of the decision block 320. Otherwise, process flow advances to step 330, to generate and store a network configuration file, as has already been described in relation to the step 230 of the process 200.

In step 335, the configuration file is offered for editing. In decision block 340, the server node 120 determines whether the edited configuration file has been committed and a command to proceed with system configuration has been received from an authorized person or persons. In some embodiments, the step 335 and the decision block 340 are identical or similar to the step 235 and the decision block 240 of the process 200, respectively.

In step 350, new configuration information is sent to the server nodes of the messaging system 100. In the process 300, this is done substantially at the same time, i.e., configuration commands and data are sent to the different server nodes of the messaging system 100 without waiting for responses from the nodes. As in the process 200, the server nodes may be rebooted, either immediately or at some predetermined time, for example, in response to a command of the local server administrator. The process 300 then terminates at flow point 399.

FIGS. 4A through 4L illustrate operation of a configurator embodiment implementing configuration processes, such as the processes 200 or 300, within an exemplary networked system. The display windows, as well as the various features displayed, are shown here for illustration and not limitation.

After entering the address of the home server of the system and administrator information (password, for example), clicking on the "Get Current Configuration" button causes the configurator to logon to the home server and retrieve the networking mailboxes of the home server; the configurator then proceeds to logon to each correspondent server of the system and retrieve their mailboxes. The correspondent server logons are accomplished using an "Enterprise Logon" or "Remote Server Authentication" feature, which allows the home server to be the authenticating server in each case. In this embodiment, when the administrator (person who is using the configurator here) has logged onto the system using an "Enterprise Logon Allowed" security setting checked on the home server, digital mailboxes on the correspondent servers that have their "Allow Enterprise Logon" flags checked may be accessed by the administrator from the home server. The resulting collection of mailboxes makes up the "configuration" of the system; it is displayed in the Configuration Data window, as shown in FIG. 4A.

Figure 4A:
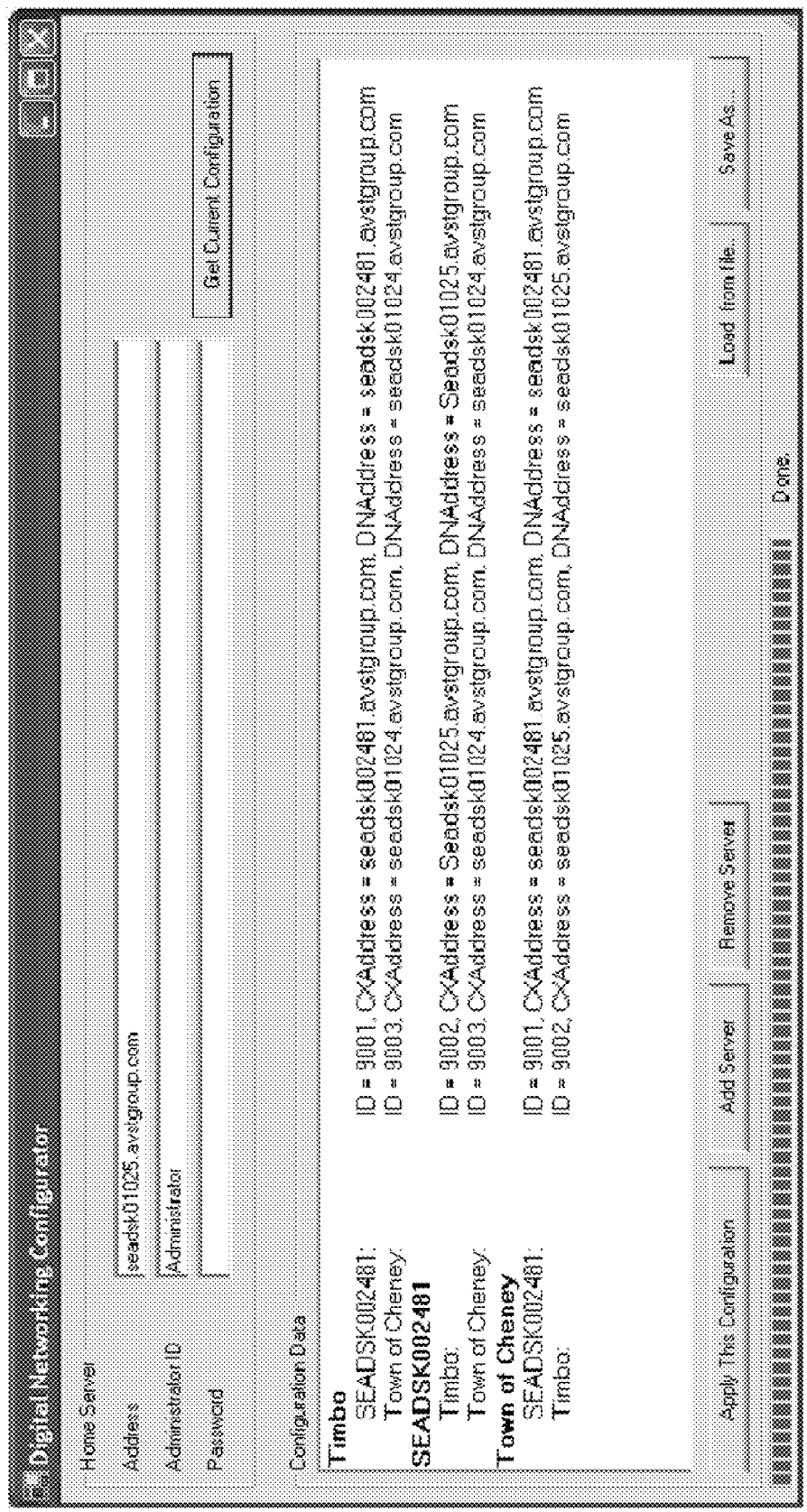

The Configuration Data window in FIG. 4A lists each server in the system by Site Name, and, for each server, lists its correspondent digital networking mailboxes/links.

Note that the configurator may also load a previously saved file for display in the Configuration Data window. This may be accomplished by clicking on the "Load from file . . . " button. Once loaded, the file is displayed in the window in the same way as a file obtained directly by interrogation of the server nodes. The loaded file may have been obtained, for example, by interrogating the server nodes at a previous time, editing a file obtained by interrogation, or created manually.

Figure 4B:
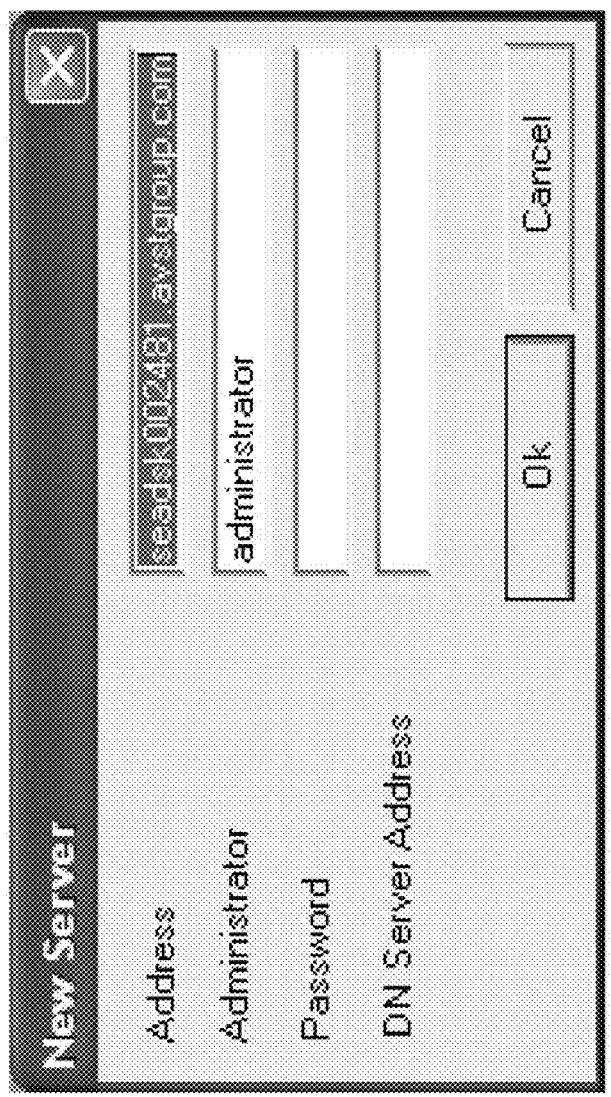

The configurator allows the administrator to change the data in the configuration file (as in steps 235 and 335). Clicking on the "Add Server" button, for example, brings up a New Server dialog window, which is shown in FIG. 4B.

Figure 4C:
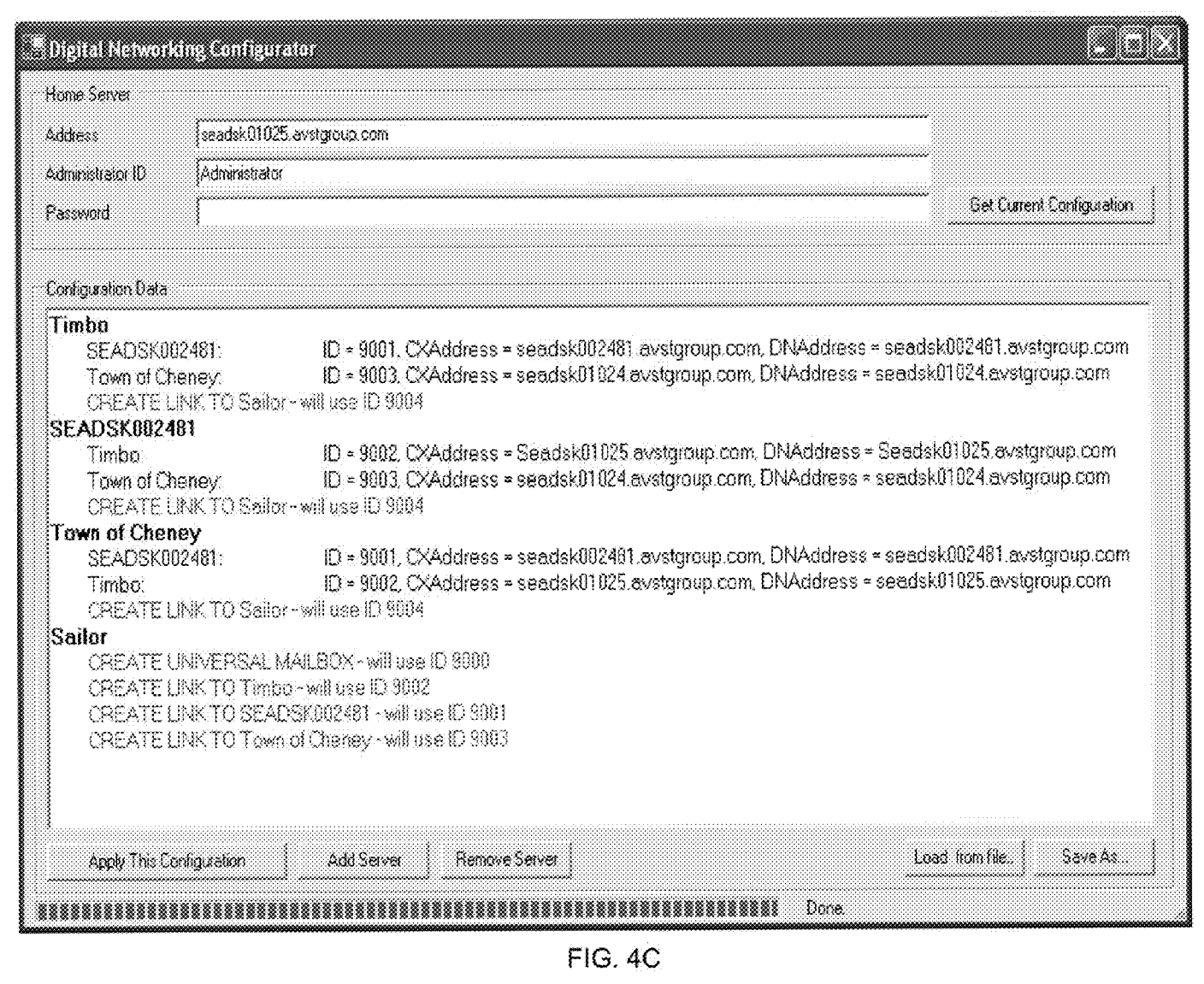

The administrator may enter the network address of the new server, an administrator ID and password to use on the new server, and digital networking server address. Clicking on the "Ok" button will update the configuration data with the steps necessary to add the new server, and the new configuration data will be displayed in the window, as is illustrated in FIG. 4C. In the illustrated embodiment, several items in FIG. 4C are displayed in a different color, red, for example, to draw attention to the steps that have not yet been performed. These items include the last item under each of the previously existing servers "Timbo," "SEADSK002481," and "Town of Cheney" ("CREATE LINK TO Sailor . . . "); and all items under the new server "Sailor." In other words, links from the previously existing servers pointing to the new server should be created; links from the new server to the previously existing servers and the universal mailbox should also be created.

(A universal mailbox, such as a universal mailbox shown under the "Sailor" server in FIG. 4C, is a network node mailbox created to act as a node identifier for messages coming from nodes that have not been defined in the system. Universal mailboxes allow the nodes to accept messages on an ad-hoc basis.)

Notice that in the display window of FIG. 4C, mailbox number 9004 was chosen as the mailbox number for all the new digital networking mailboxes pointing to the new server ("Sailor"), and that the new mailbox numbers on "Sailor" match those on the existing servers. For example, mailbox number 9002 points to "Timbo" on each of the servers, including the new server, Sailor. This feature allows a client (configurator) to ask a server for an unused mailbox ID of a specific type (i.e., digital networking mailbox of a server node). In the process, the client can suggest an ID, in effect asking the server, "I want to create a new mailbox with ID=XXXX. Is that number ok? If not, what's another number I can use?" The server then uses various rules, such as a valid ID range for the requested mailbox type, and either tells the client that the suggested number is acceptable, or responds with another number to use. As shown in FIG. 4C, consistent system-wide mailbox numbering may be attempted or enforced by the configurator in some embodiments.

At this point, the configuration data can be saved to a CSV file and manually edited, for example, using Excel® or Windows® Notepad applications, if the administrator does not like the mailbox numbers picked for the new mailboxes, or wishes to edit the settings on the mailboxes for whatever reason. After editing, the file can be re-load and the configuration data in the file applied to the system.

Clicking on the "Apply This Configuration" button will cause the configurator to logon to each server listed and create or update each mailbox. If the administrator made changes to fields in existing mailboxes, these will be updated as well.

Figure 4D:
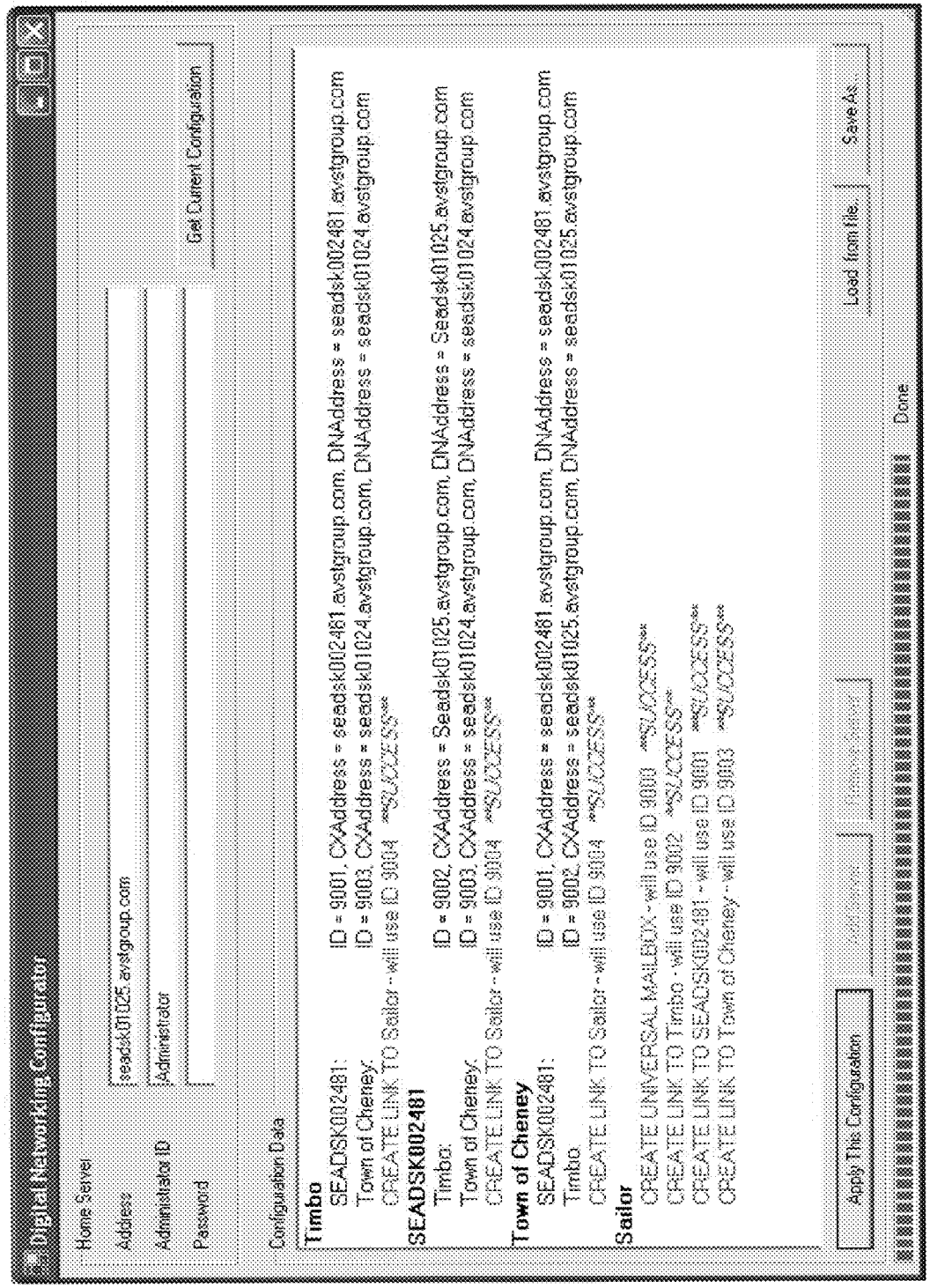
Figure 4E:
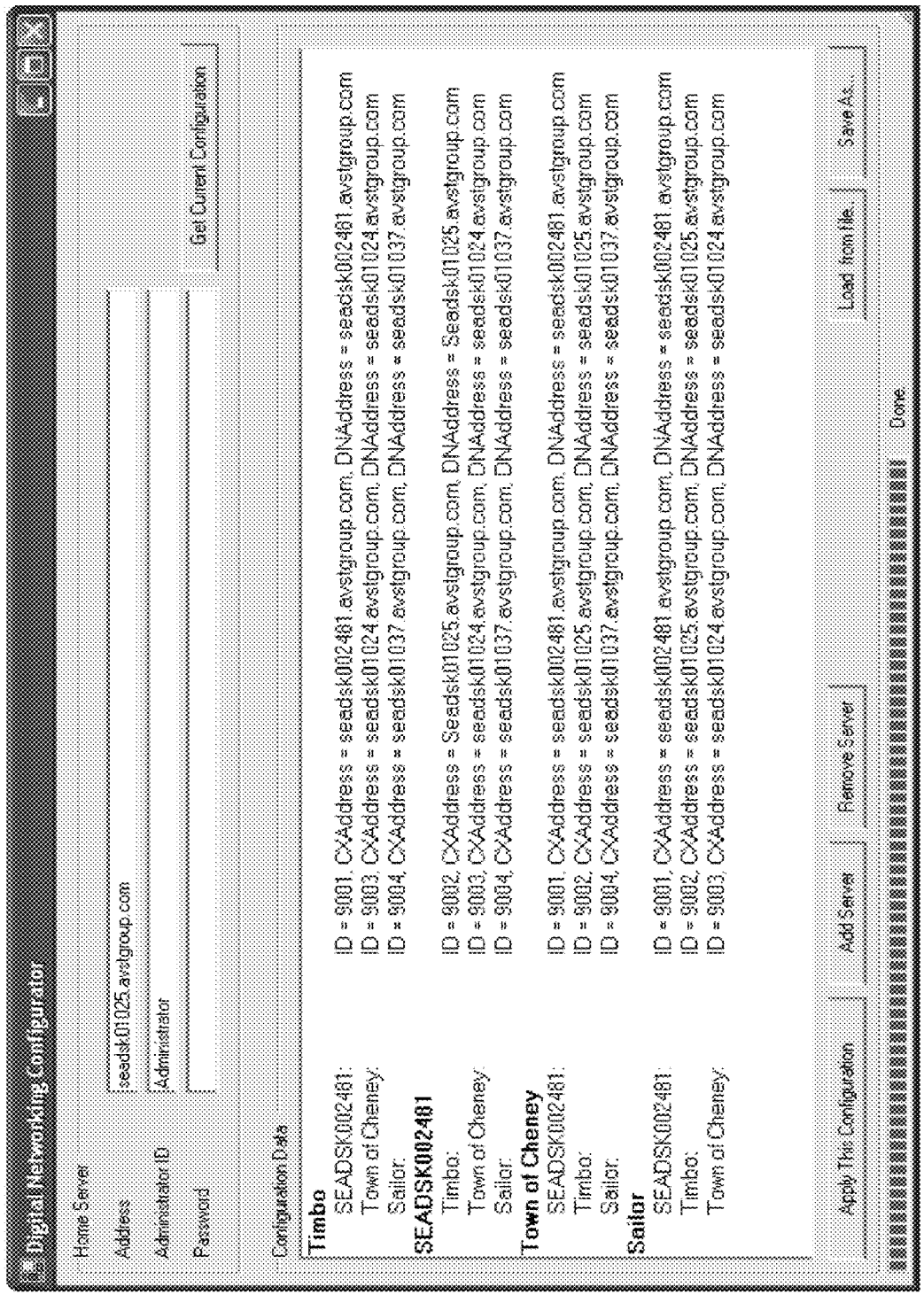

Once the update process is complete, the results of each action will be shown in the display window with the words "SUCCESS" or "FAILURE" appearing after each item, as is illustrated in FIG. 4D. After this has been done, the administrator can click on the "Get Current Configuration" button again to verify that everything is working as configured. The resulting data should indicate the new server in the networked system, as is illustrated in FIG. 4E.

The configurator also allows the administrator to remove a server from the system. To accomplish this task, the administrator clicks on the "Remove Server" button. In response, the configurator displays the dialog box illustrated in FIG. 4F. This dialog lists all the servers of the system, except the home server, because, in the illustrated embodiment, the home server cannot be removed from the system by the configurator. Removal of the home server would prevent the configurator at the home server from communicating additional changes of the system configuration to the correspondent servers.

Figure 4F:
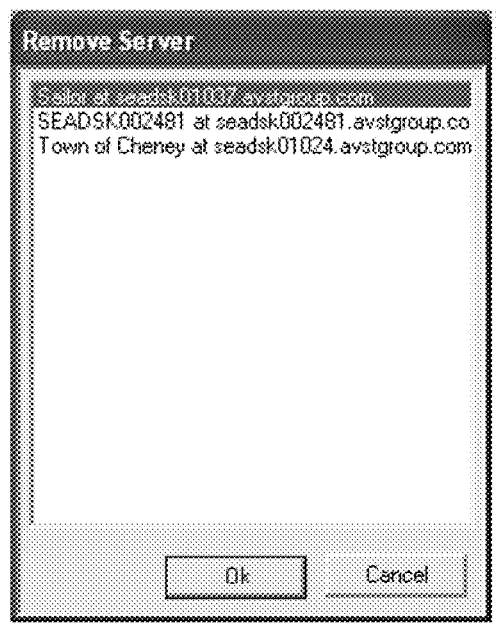

Selecting a server from the list in the dialog box and clicking on the Ok button updates the configuration data with the steps necessary to remove the selected server from the system. As illustrated in FIG. 4F, the "Sailor" server has been selected for removal.

Figure 4G:
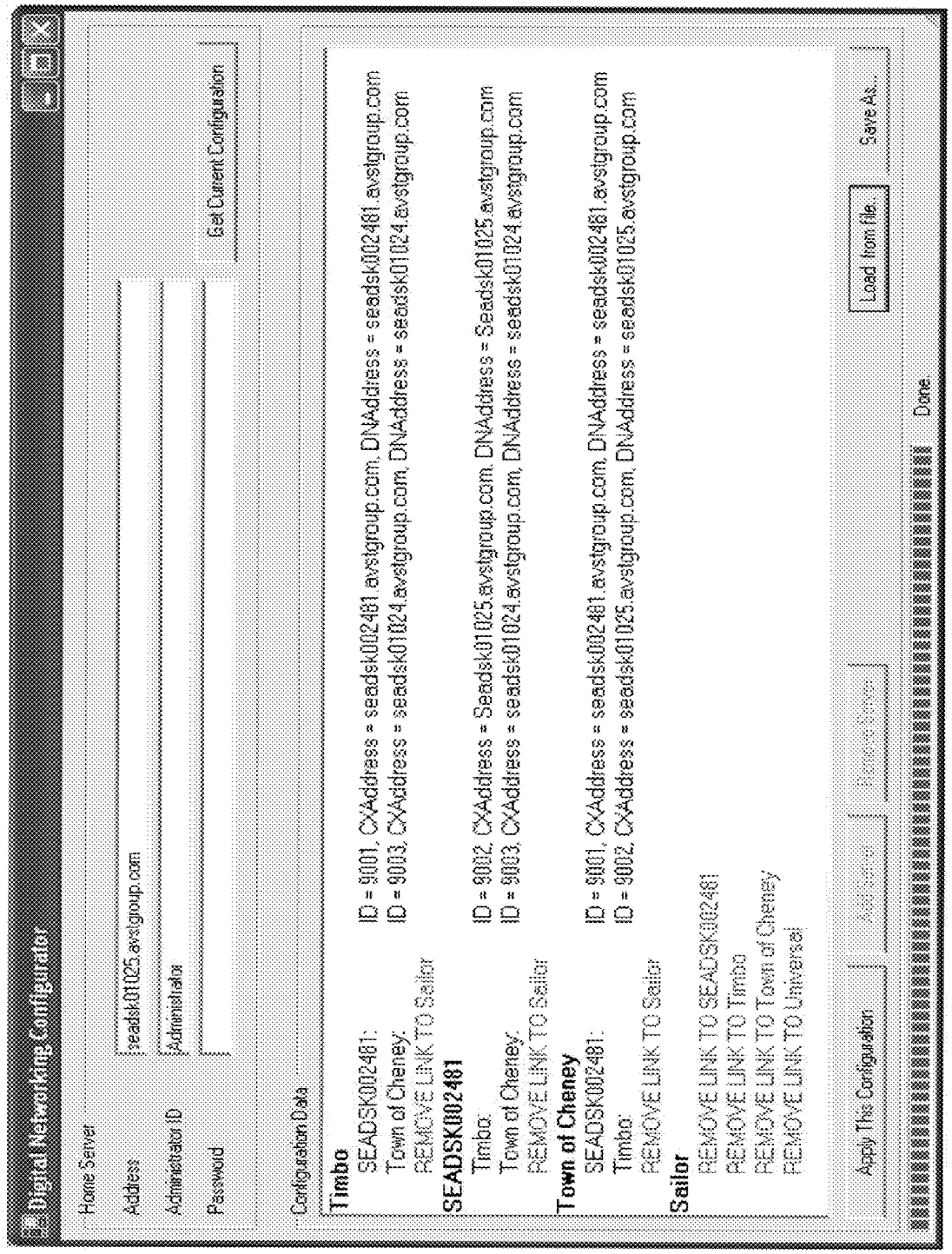

The updated data will be displayed in the main window, as is shown in FIG. 4G. In the illustrated embodiment, several items in FIG. 4G are highlighted in a different color, red, for example, to draw attention to the steps that will be carried out when the administrator clicks on the "Apply This Configuration" button. The highlighted steps include "REMOVE LINK TO Sailor" entries under each of the remaining servers, and all links under the "Sailor" server. In other words, selecting a server for removal and applying the new configuration will remove the following links: (1) all displayed links from the remaining servers to the selected server, and (2) all displayed links on the selected server, including the universal mailbox link.

Once again, the data of the new configuration may be saved to a CSV file and edited by the administrator. In this manner, changes can be made to existing mailbox fields, steps can be added or removed, and other modifications to the configuration made as well.

Figure 4H:
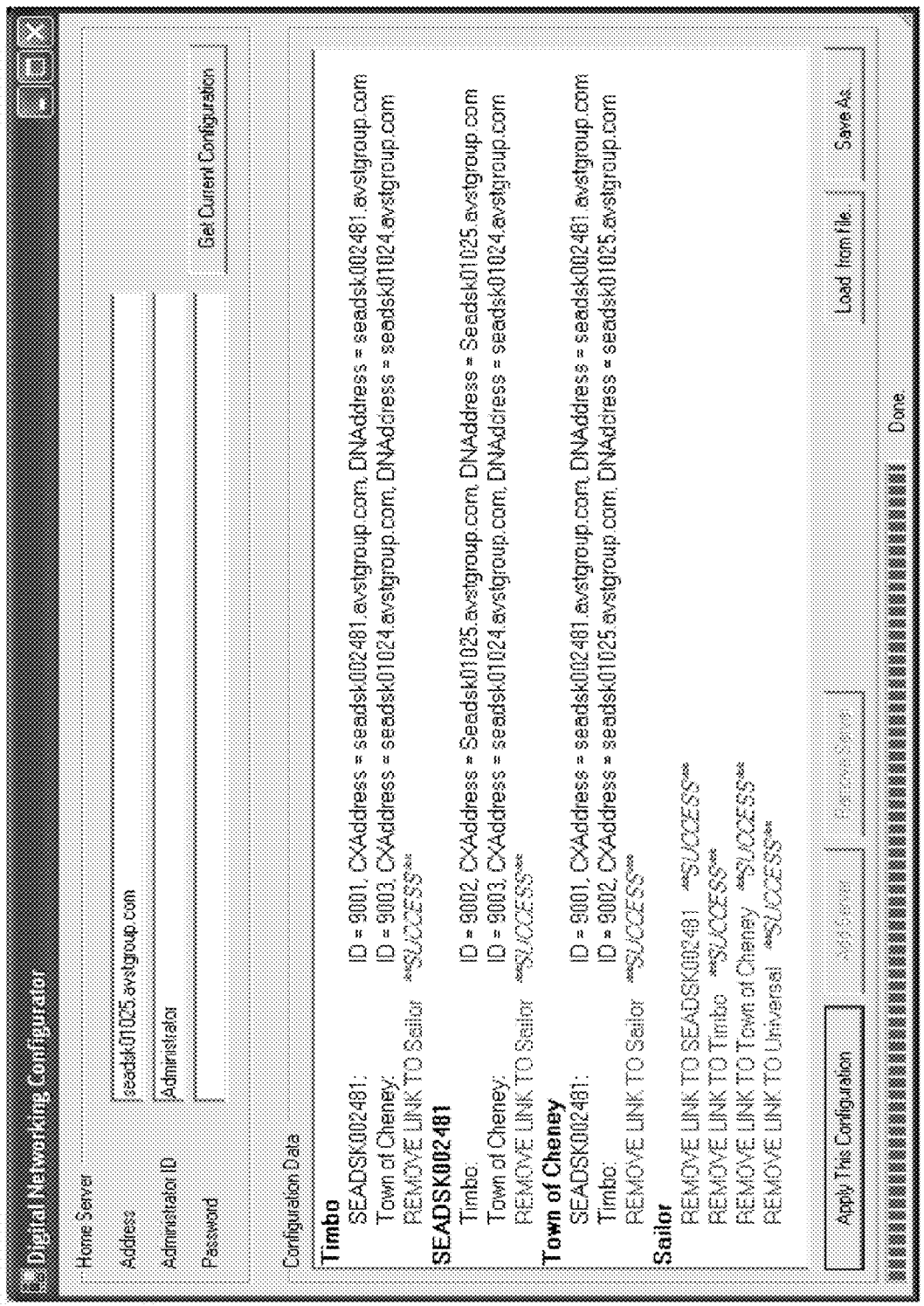
Figure 41:
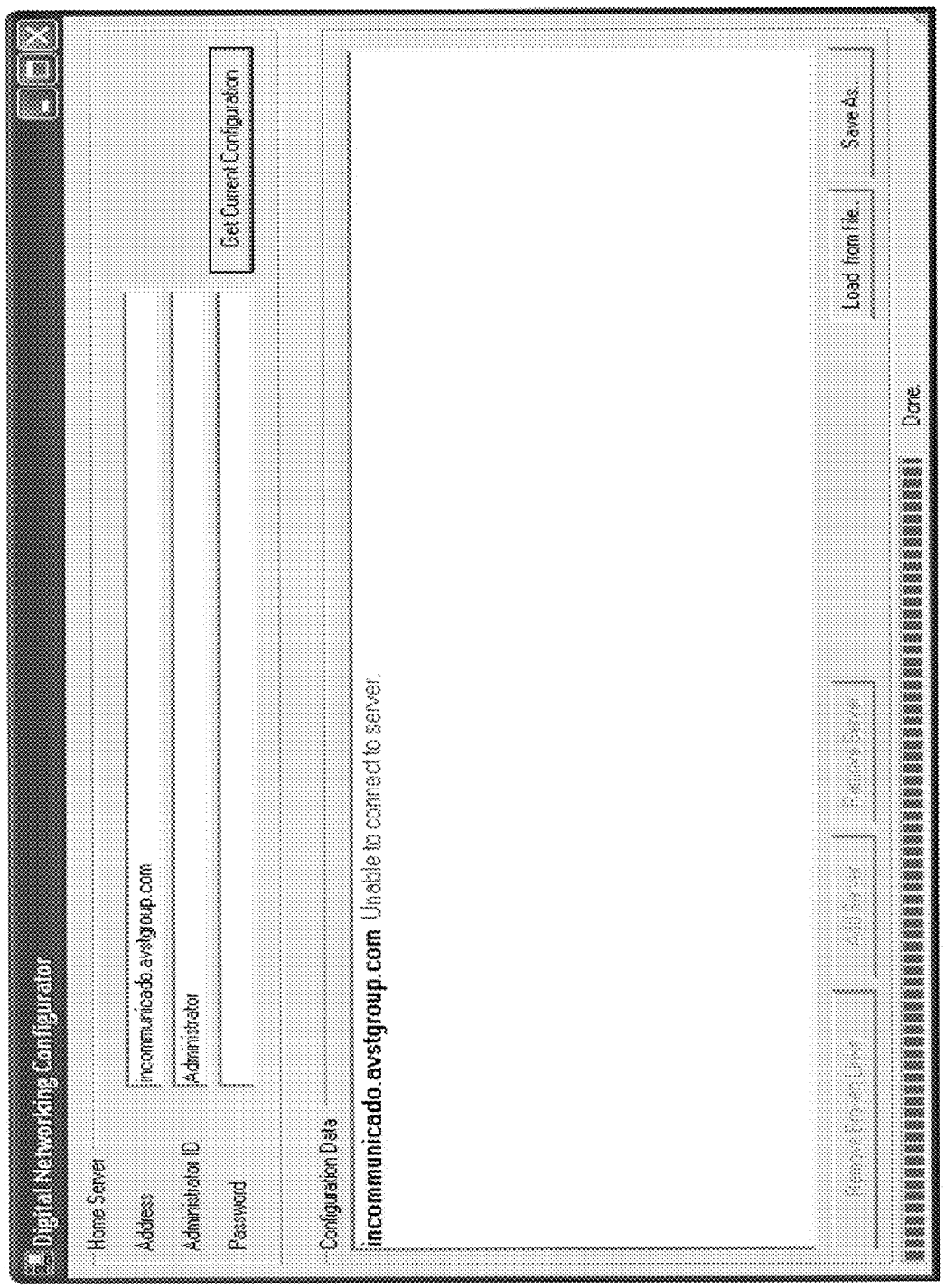

Clicking on the "Apply This Configuration" button will cause the window display to be updated with SUCCESS or FAILED indications for each item. In the illustrated embodiment, the SUCCESS and FAILED indications are displayed in a different color, red, for example. FIG. 4H illustrates the updated display.

Configuration errors may be encountered during the steps of interrogation (e.g., steps 215/220 and 315/320) and steps of configuring the servers (e.g., steps 250 and 350). In the illustrated embodiment, the errors encountered by the interrogation initiated, for example, by clicking on the "Get Current Configuration" button will disable the "Add Server" and "Remove Server" buttons and their associated functions.

Note that a standalone server with no digital networking configuration is in a valid initial state. From the perspective of the configurator, this amounts to a digital networking system with one node.

The list of errors that may be encountered during the interrogation steps includes the following errors:

(a) Communication failure with the home server;
(b) Communication failure with a correspondent server; and
(c) Missing links between servers.

The above list is exemplary and non-exclusive.

Communication failure errors include a failure to attach, logon, or retrieve data from a server, such as mailbox summaries or server-related information.

In the illustrated embodiment, a communication failure with the home server causes all processing to be aborted. FIG. 4I illustrates configurator window display caused by communication failure with the home server Incommunicado.avstgroup.com.

Figure 4J:
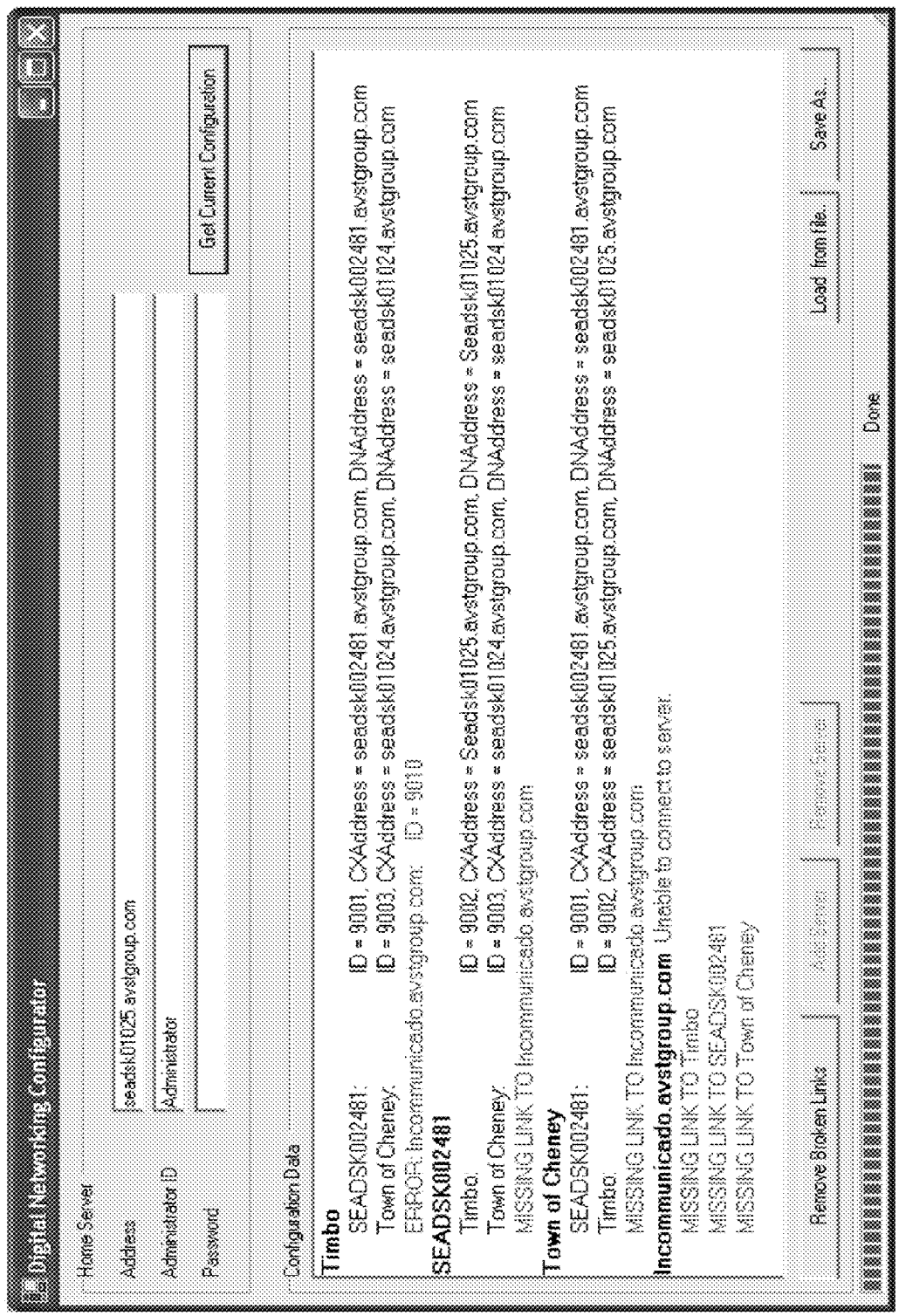

A communication failure with one or more of the correspondent server nodes does not prevent processing of the other correspondent server nodes. In the illustrated embodiment, the configuration data will be displayed listing the errors encountered in a different color (red, for example). Such errors also cause the "Apply This Configuration" button to change to the "Remove Broken Links" button. This is illustrated in FIG. 4J, which shows that there was an error connecting to "Incommunicado.avstgroup.com," and that the servers "SEADSK002481" and "Town Of Cheney" are both missing links to this server.

Missing links to a server occur when at least one other server is linked to the server, while at least one other server is not linked to the server in the messaging system. In the example above, only the "Timbo" server has a mailbox link to the "Incommunicado.avstgroup.com" server. The other two servers ("SEADSK002481" and "Town of Cheney") list a missing link because they do not have mailboxes pointing to the "incommunicado" server.

The "Incommunicado" server itself lists all links as missing because it could not be reached, and so no mailboxes could be found on it.

Figure 4K:
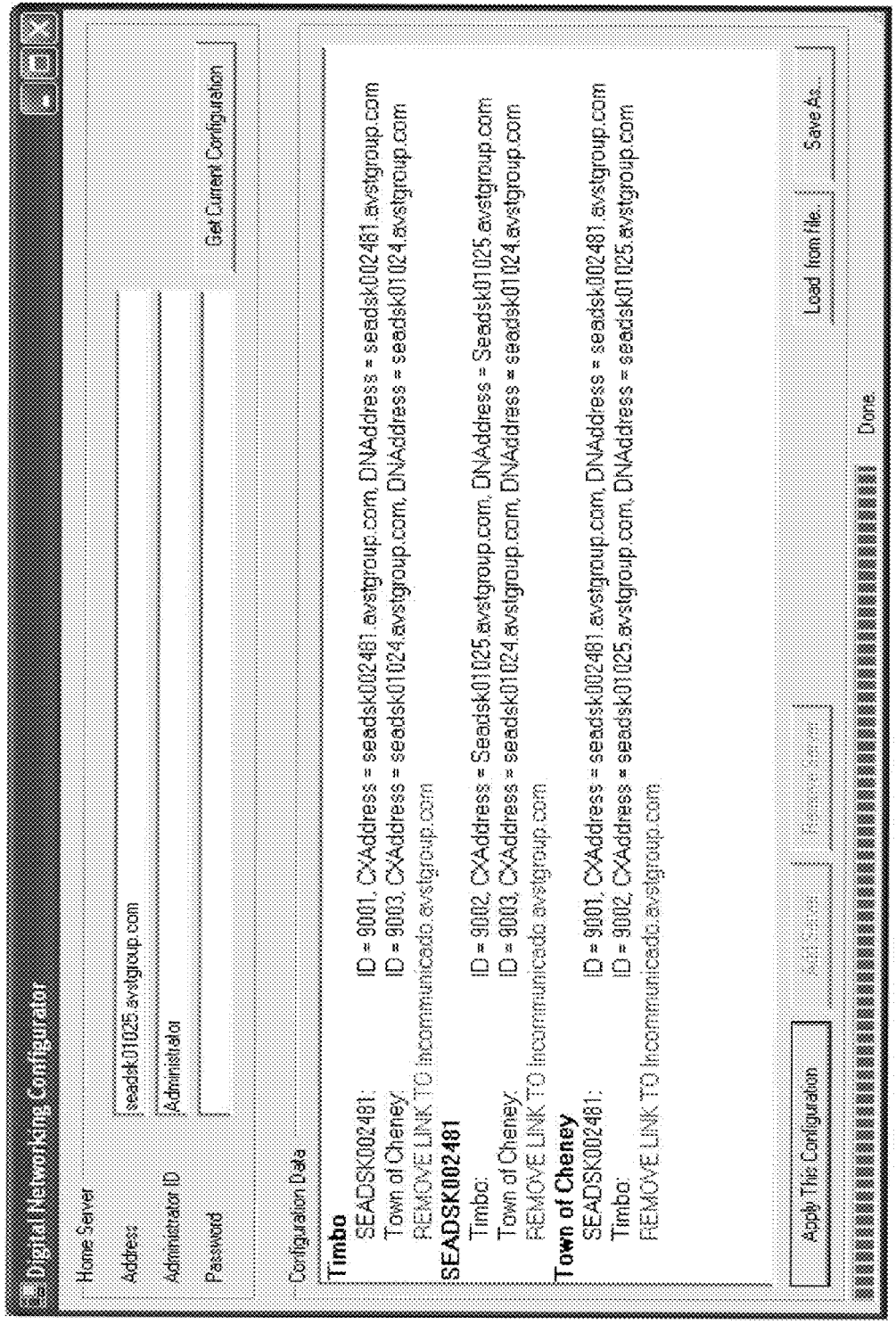

At this point in the process, the "Apply This Configuration" button has been changed to a "Remove Broken Links" button. In the illustrated embodiment, clicking on the "Remove Broken Links" button will cause the configurator to flag for removal all mailboxes that point to a server that had connection problems. The problem server itself will be removed from the list of servers of the system. This is illustrated in FIG. 4K. The "REMOVE LINK TO Incommunicado.avstgroup.com" tasks under each of the three servers are highlighted in a different color, for example, red. The "Apply This Configuration" button is once again active. Clicking on it will cause the configurator to perform the highlighted tasks.

Figure 4L:
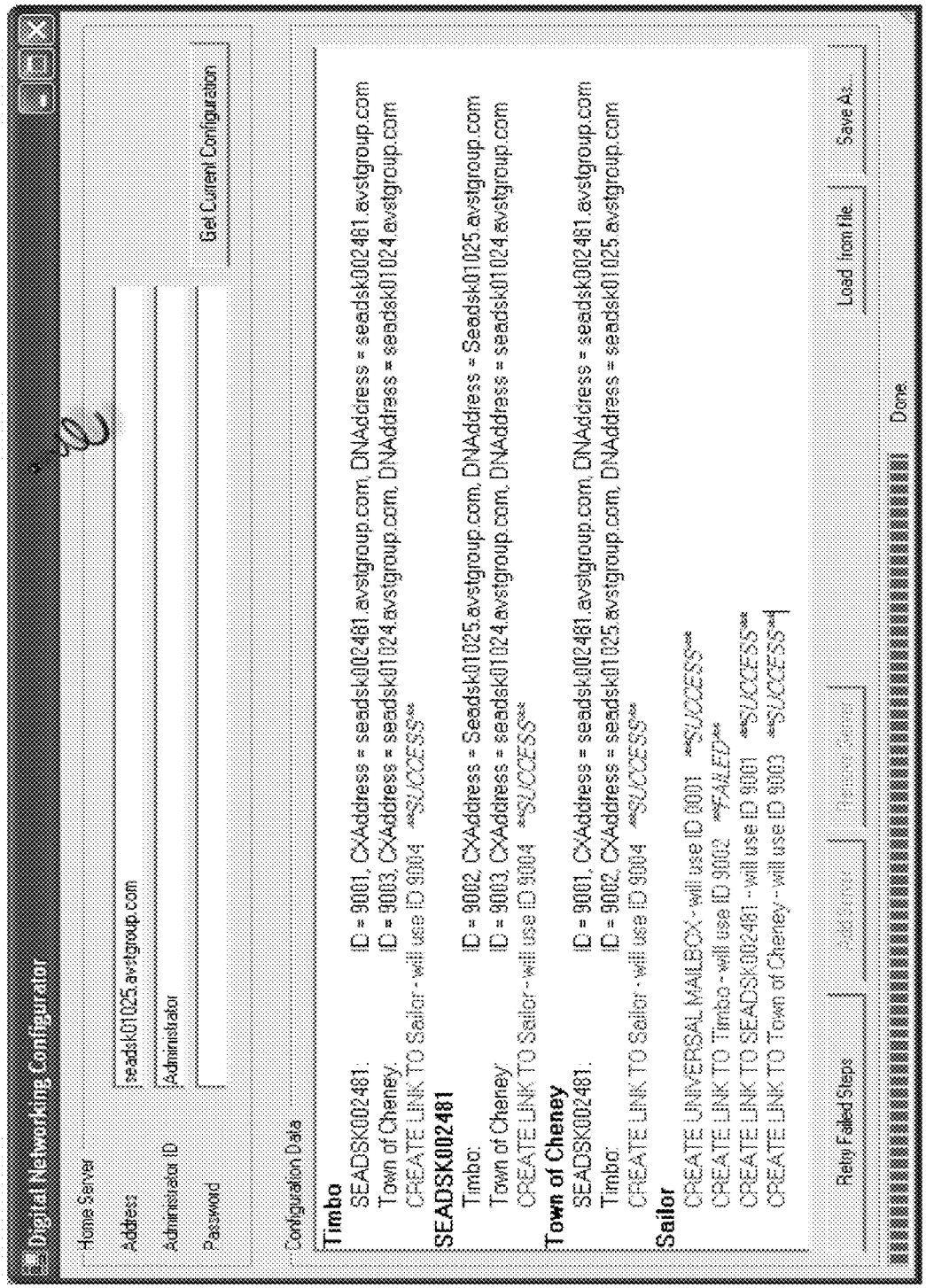

Errors may also be encountered during update or configuration steps (e.g., steps 250 and 350). If an error is encountered during an update (such as adding a server), processing of other steps may continue. As illustrated in FIG. 4L, the failed step or steps are marked as FAILED and the "Apply This Configuration" button is changed to a "Retry Failed Steps" button.

In the case shown in FIG. 4L, the failure happened with mailbox 9002 on "Sailor," probably because someone created another mailbox numbered 9002 on that server between the time that the configurator determined that 9002 was an available number, and the time that "Apply This Configuration" button was clicked.

At this point the administrator may take one of two course of action to remedy the problem: (1) go to the server in question—"Sailor" in this case—and try to resolve whatever caused the configuration step to fail, or (2) save the configuration to a file, e.g., a CSV file, and edit the appropriate mailbox number, e.g., in Excel® or Notepad, reload the configuration file, and again attempt to update the configuration.

The above specification describes in considerable detail the inventive apparatus, methods, and articles of manufacture for configuring networked messaging systems. This was done for illustration purposes only. Neither the specific embodiments of the invention as a whole, nor those of its features limit the general principles underlying the invention. The specific features described herein may be used in some embodiments, but not in others, without departure from the spirit and scope of the invention as set forth. It should be noted in particular that the invention does not necessarily require interrogation of all nodes of the network; while all nodes are interrogated in some embodiments, in other embodiments only selected nodes are interrogated. Similarly, while all nodes are configured in some embodiments, only selected nodes are configured in other embodiments. Various physical arrangements of components and various step sequences also fall within the intended scope of the invention. The invention may be used both to change system configuration and to configure a system that has not been previously configured. The invention may be used to add server node(s), delete server node(s), or to change node configuration without node addition or deletion. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is carried out by the claims and their equivalents.

We claim:

1. A computer implemented method of configuring a networked messaging system, the method comprising steps of:
    obtaining, from each node of a plurality of nodes of the networked messaging system, at least a portion of current configuration information of said each node;
    generating an editable configuration file comprising the portions of the current configuration information obtained from the plurality of nodes;
    presenting the editable configuration file to at least one administrator to allow the at least one administrator to provide one or more edits to the editable configuration file;
    storing the editable configuration file after the step of generating and before the step of presenting;
    receiving from the at least one administrator the one or more edits to the editable configuration file, in response to the step of presenting;
    changing the editable configuration file in accordance with the one or more edits to make an updated configuration file comprising updated configuration information;
    configuring the networked messaging system in accordance with the updated configuration information in the updated configuration file; and
    sending from a home server of the networked messaging system to a correspondent server of the networked messaging system an inquiry whether a new mailbox of a particular type with a particular mailbox identifier is consistent with mailbox numbering rules of the correspondent server;
    wherein:
    at least one file selected from the group consisting of the editable configuration file and the updated configuration file comprises first mailbox data defining and numbering one or more mailboxes of one or more human users of the networked messaging system, each mailbox of the one or more mailboxes being configured to store messages for a human user associated with said each mailbox;
    the step of generating is performed after the step for obtaining, the step of presenting is performed after the step of generating, the step of receiving is performed after the step of presenting, the step of changing is performed after the step of receiving, and the step for configuring is performed after the step of changing;
    mailbox numbering rules are not consistent across all nodes of the networked messaging system; and
    the steps of obtaining, generating, presenting, receiving, changing, and configuring are performed by at least one computer.

2. A method according to claim 1, wherein the step of storing comprises storing the editable configuration file in a format selected from a group consisting of a spreadsheet format, a text format, and a comma separated variables format.

3. A method according to claim 2, further comprising:
    storing the updated configuration file in the format after the step of changing and before the step of configuring.

4. A method according to claim 1, wherein:
    the one or more edits comprise at least one change to the first mailbox data.

5. A method according to claim 4, wherein the at least one change is such that a new server is added to the networked messaging system after the step of configuring, the new server comprising one or more new mailboxes.

6. A method according to claim 4, wherein the at least one change is such that a server comprising one or more mailboxes is deleted from the networked messaging system after the step of configuring.

7. A method according to claim 4, wherein the at least one change is such that a new mailbox is added to a correspondent server of the networked messaging system after the step of configuring.

8. A method according to claim 4, wherein the at least one change is such that a mailbox is deleted from a correspondent server of the networked messaging system after the step of configuring.

9. A method according to claim 4, wherein the at least one change is such that a definition of a mailbox on a correspondent server of the networked messaging system is changed after the step of configuring.

10. A method according to claim 1, wherein the step of obtaining comprises interrogating the plurality of nodes.

11. A method in accordance with claim 1, further comprising:
    sending from the home server of the networked messaging system to the correspondent server of the networked messaging system a request to assign a mailbox identifier to a new mailbox of a particular type in accordance with mailbox numbering rules of the correspondent server.

12. A method in accordance with claim 1, further comprising:
    displaying changes that will be made to the networked messaging system when the step of configuring is performed, wherein the step of displaying is performed after the step of presenting and before the step of configuring.

13. A method in accordance with claim 1, wherein the step of presenting comprises presenting the editable configuration file to a first person at a first node and presenting the editable configuration file to a second person at a second node.

14. A method according to claim 1, wherein said each mailbox is configured to receive and store voicemail messages.

15. A method according to claim 1, wherein said each mailbox is configured to receive and store voicemail messages, facsimile messages, and email messages.

16. A method according to claim 1, wherein:
the one or more mailboxes comprise a first mailbox and a second mailbox;
the plurality of nodes comprises a first node and a second node, the first node being geographically remote from the second node; and
the first mailbox is associated with the first node, and the second mailbox is associated with the second node.

17. An article of manufacture comprising at least one machine readable memory device storing instructions, wherein, when the instructions are executed by at least one processor of a home server node of a messaging system, the messaging system comprising the home server node and a plurality of correspondent nodes, the correspondent nodes being connected to the home server node via a network, the instructions configure the at least one processor to
obtain from each node of a plurality of nodes of the messaging system at least a portion of current configuration information of said each node;
generate an editable configuration file comprising the portions of the current configuration information obtained from the plurality of nodes, wherein the editable configuration file is generated after the portion of the current configuration information of said each node is obtained from said each node;
present the editable configuration file to at least one administrator to allow the at least one administrator to provide one or more edits to the editable configuration file, wherein the editable configuration file is presented to the at least one administrator after the editable configuration file is generated;
store the editable configuration file after the editable configuration file is generated and before the editable configuration file is presented to the at least one administrator;
receive from the at least one administrator the one or more edits to the editable configuration file, in response to the at least one administrator being presented with the editable configuration file to allow the at least one administrator to provide the one or more edits;
change the editable configuration file in accordance with the one or more edits to make an updated configuration file comprising updated configuration information, wherein the editable configuration file is changed in accordance with the one or more edits to make the updated configuration file after the one or more edits are received from the at least one administrator;
configure the messaging system in accordance with the updated configuration information in the updated configuration file, wherein the messaging system is configured in accordance with the updated configuration information in the updated configuration file after the editable configuration file is changed in accordance with the one or more edits to make the updated configuration file; and
send from the home server of the networked messaging system to the correspondent server of the networked messaging system a request to assign a mailbox identifier to a new mailbox of a particular type in accordance with mailbox numbering rules of the correspondent server;
wherein:
mailbox numbering rules are not consistent across all nodes of the networked messaging system; and
at least one file selected from the group consisting of the editable configuration file and the updated configuration file comprises first mailbox data defining and numbering one or more mailboxes of one or more human users of the networked messaging system, each mailbox of the one or more mailboxes being configured to store messages for a human user associated with said each mailbox.

18. A computer implemented method of configuring a networked messaging system, the method comprising:
a step for obtaining from each node of a plurality of nodes of the networked messaging system at least a portion of current configuration information of said each node;
generating an editable configuration file comprising the portions of the current configuration information obtained from the plurality of nodes;
presenting the editable configuration file to at least one administrator to allow the at least one administrator to provide one or more edits to the editable configuration file;
storing the editable configuration file after the step of generating and before the step of presenting;
receiving from the at least one administrator one or more edits to the editable configuration file, in response to the step of presenting;
changing the editable configuration file in accordance with the one or more edits to make an updated configuration file comprising updated configuration information;
sending from a home server of the networked messaging system to a correspondent server of the networked messaging system an inquiry whether a new mailbox of a particular type with a particular mailbox identifier is consistent with mailbox numbering rules of the correspondent server; and
a step for configuring the networked messaging system in accordance with the updated configuration information in the updated configuration file;
wherein:
at least one file selected from the group consisting of the editable configuration file and the updated configuration file comprises first mailbox data defining and numbering one or more mailboxes of one or more human users of the networked messaging system, each mailbox of the one or more mailboxes being configured to store messages for a human user associated with said each mailbox;
the step of generating is performed after the step for obtaining, the step of presenting is performed after the step of generating, the step of receiving is performed after the step of presenting, the step of changing is performed after the step of receiving, and the step for configuring is performed after the step of changing;
mailbox numbering rules are not consistent across all nodes of the networked messaging system; and
the step for obtaining, the step for configuring, the step of generating, the step of presenting, the step of receiving, and the step of changing are performed by at least one computer.

19. A networked messaging system comprising a first node and a plurality of second nodes, wherein the first node is configured to
obtain from each node of the plurality of second nodes at least a portion of current configuration information of said each node of the plurality of second nodes;

generate an editable configuration file comprising the portions of the current configuration information obtained from the plurality of second nodes;

present the editable configuration file to at least one administrator to allow the at least one administrator to provide one or more edits to the editable configuration file;

store the editable configuration file after the editable configuration file is generated and before the editable configuration file is presented to the at least one administrator;

receive from the at least one administrator one or more edits to the editable configuration file, in response to the at least one administrator being presented with the editable configuration file to allow the at least one administrator to provide the one or more edits;

change the editable configuration file in accordance with the one or more edits to make an updated configuration file comprising updated configuration information;

send from a home server of the networked messaging system to a correspondent server of the networked messaging system an inquiry whether a new mailbox of a particular type with a particular mailbox identifier is consistent with mailbox numbering rules of the correspondent server; and configure the networked messaging system in accordance with the updated configuration information in the updated configuration file;

wherein:

at least one file selected from the group consisting of the editable configuration file and the updated configuration file comprises first mailbox data defining and numbering one or more mailboxes of one or more human users of the networked messaging system, each mailbox of the one or more mailboxes being configured to store messages for a human user associated with said each mailbox;

the editable configuration file is generated after the portion of the current configuration information of said each node is obtained from said each node;

the editable configuration file is presented to the at least one administrator after the editable configuration file is generated;

the editable configuration file is changed in accordance with the one or more edits to make the updated configuration file after the on or more edits are received from the at least one administrator;

mailbox numbering rules are not consistent across all nodes of the networked messaging system; and the messaging system is configured in accordance with the updated configuration information in the updated configuration file after the editable configuration file is changed in accordance with the one or more edits to make the updated configuration file.

* * * * *